United States Patent
Juncal et al.

(10) Patent No.: US 9,345,207 B2
(45) Date of Patent: May 24, 2016

(54) COMMERCIAL AEROPONICS SYSTEM

(71) Applicants: Shaun Juncal, Montecito, CA (US);
Aaron Ferguson, Solvang, CA (US);
Michael Berruti, Colorado Springs, CO (US)

(72) Inventors: Shaun Juncal, Montecito, CA (US);
Aaron Ferguson, Solvang, CA (US);
Michael Berruti, Colorado Springs, CO (US)

(73) Assignee: Harvest Urban Farms, Inc., Surrey, British Columbia (CA)

( * ) Notice: Subject to any disclaimer, the term of this patent is extended or adjusted under 35 U.S.C. 154(b) by 128 days.

(21) Appl. No.: 14/021,149

(22) Filed: Sep. 9, 2013

(65) Prior Publication Data

US 2015/0068122 A1    Mar. 12, 2015

(51) Int. Cl.
*A01G 31/02*  (2006.01)
*A01G 31/06*  (2006.01)

(52) U.S. Cl.
CPC ............... *A01G 31/02* (2013.01); *A01G 31/06* (2013.01)

(58) Field of Classification Search
CPC ............... A01G 31/06; A01G 31/001; A01G 2031/006; A01G 31/02; A01G 31/00
USPC ................. 47/62 A, 59 R, 60, 62 R, 63
See application file for complete search history.

(56) References Cited

U.S. PATENT DOCUMENTS

| | | | |
|---|---|---|---|
| 5,299,384 A * | 4/1994 | Andrews | 47/66.5 |
| 5,573,669 A * | 11/1996 | Jensen | 210/602 |
| 5,724,768 A | 3/1998 | Ammann, Jr. | |
| 7,823,328 B2 | 11/2010 | Walhovd | |
| 8,225,549 B2 | 7/2012 | Simmons | |
| 8,505,238 B2 | 8/2013 | Luebbers et al. | |
| 2009/0126269 A1* | 5/2009 | Wilson et al. | 47/62 R |
| 2011/0056132 A1* | 3/2011 | Gardner | 47/62 R |
| 2011/0093122 A1* | 4/2011 | Koumoudis | 700/284 |
| 2012/0085026 A1 | 4/2012 | Morris | |
| 2012/0192487 A1* | 8/2012 | Tanaka et al. | 47/60 |
| 2014/0083008 A1* | 3/2014 | Kotsatos | 47/62 N |
| 2014/0083009 A1* | 3/2014 | Panopoulos et al. | 47/62 R |
| 2015/0135593 A1* | 5/2015 | Ross et al. | 47/62 R |

* cited by examiner

*Primary Examiner* — Monica Williams
*Assistant Examiner* — Magdalena Topolski
(74) *Attorney, Agent, or Firm* — Felix L. Fischer (57) ABSTRACT

An aeroponic chamber incorporating a molded tub incorporates an integral angled interface having ports to receive misting nozzles, a drain sump including an outlet, and support brackets incorporating saddles adapted to be received on support rails with integral conduits. The conduits are connected to the misting nozzles. At least one support tray with an arcuate surface is supported on the molded tub and has a plurality of apertures to receive mesh seed pouches.

11 Claims, 10 Drawing Sheets

COMMERCIAL AEROPONICS SYSTEM

BACKGROUND

1. Field

This invention relates generally to the field of apparatus and methods for aeroponic plant agriculture and more particularly to a commercial scale system for support of aeroponically grown plants in an array of aeroponic chambers with integrated structural support and misting systems supporting multi-plant chambers with drainage recycling.

2. Description of the Related Art

Aeroponics is a method of growing plants where the roots are not contained in a medium such as soil employed in conventional farming, water baths used in hydroponic farming or other root bearing substance. Instead, the roots are suspended inside a chamber where water and nutrients are "misted" onto them. This provides the plants with the optimal amounts of water and nutrients without wasting either in the form of runoff or unneeded fertilization. While aeroponics has been in use for decades, there have not been efficient structural arrangements created for large scale facilities to provide commercial scale agricultural production.

It is therefore desirable to provide a system for commercial scale aeroponic plant farming.

SUMMARY

The embodiments disclosed herein overcome the shortcomings of the prior art by providing an aeroponic chamber incorporating a molded tub having an integral angled interface having ports to receive misting nozzles, a drain sump including an outlet, and support brackets incorporating saddles adapted to be received on support rails with integral conduits. The conduits are connected to the misting nozzles. At least one support tray with an arcuate surface is supported on the molded tub and has a plurality of apertures to receive mesh seed pouches.

In one adaptation, an aeroponic farming system employs a plurality of aeroponic chambers and a matrix of support rails having integral water/nutrient conduits, to support the aeroponic chambers which are interconnected to the water/nutrient conduits. At least one drain line is connected to the plurality of aeroponic chambers to receive water/nutrient runoff.

In a second adaptation, a closed cycle aeroponic farm incorporates a zone having an array of aeroponic chambers supported on a matrix of support rails with integrated water/nutrient conduits. A plant ready water/nutrient reservoir is connected through a high pressure pump to the aeroponic chambers. A main drain is connected to drain lines attached to the aeroponic chambers to receive effluent water/nutrient and an effluent tank is connected to the main drain. A master control tank is connected to receive effluent water/nutrient from the effluent tank and a low pressure pump is connected intermediate the master control tank and the plant ready water reservoir to supply water/nutrient.

BRIEF DESCRIPTION OF THE DRAWINGS

These and other features and advantages of the present invention will be better understood by reference to the following detailed description of exemplary embodiments when considered in connection with the accompanying drawings wherein.

DETAILED DESCRIPTION

Embodiments shown in the drawings and described herein provide an array of aeroponic chambers supported on a matrix of tubular racks with integrated water supply conduits. The chambers incorporate integrated angular interfaces for multiple spaced misters receiving water from the integrated water supply conduits to supply water and nutrients to plants supported in holding cups received in aperture top surfaces in the chambers. The chambers are shaped for draining runoff water from plant misting into a central drain which is connected to a main drain line.

Referring to the drawings, FIGS. 1-4 show an embodiment of the aeroponic chamber 10 for incorporation in the commercial aeroponics system. The aeroponic chamber 10 is a molded tub 11 which integrates mounting brackets 12 on a support rim 14 which extends around an upper edge of the tub. Support trays 16 are received on the tub 11 to support individual mesh seed pouches as will be described in greater detail subsequently. The molded tub 11 includes an integrated angled interface 18 having multiple ports 20 spaced around the tub to receive misters as will be described in greater detail subsequently.

Figure 1:
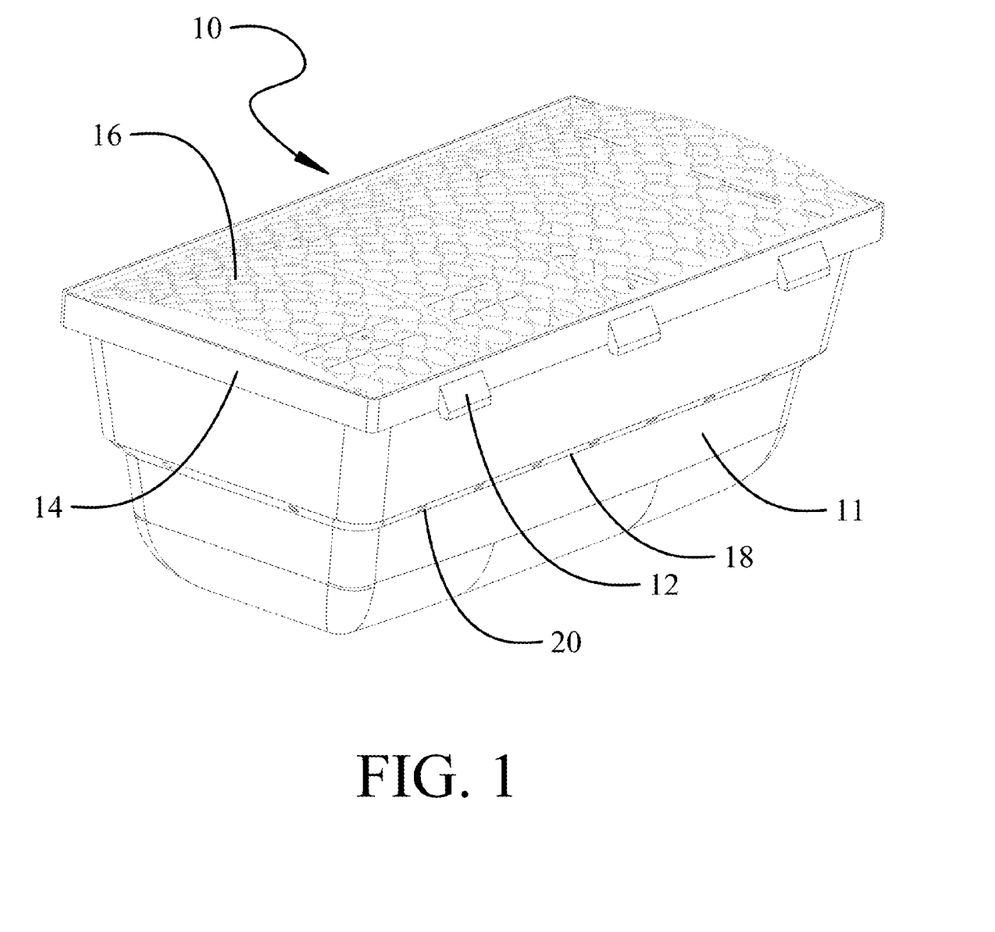
FIG. 1 is a top right pictorial view of an exemplary embodiment of the aeroponic chamber.
Figure 2:
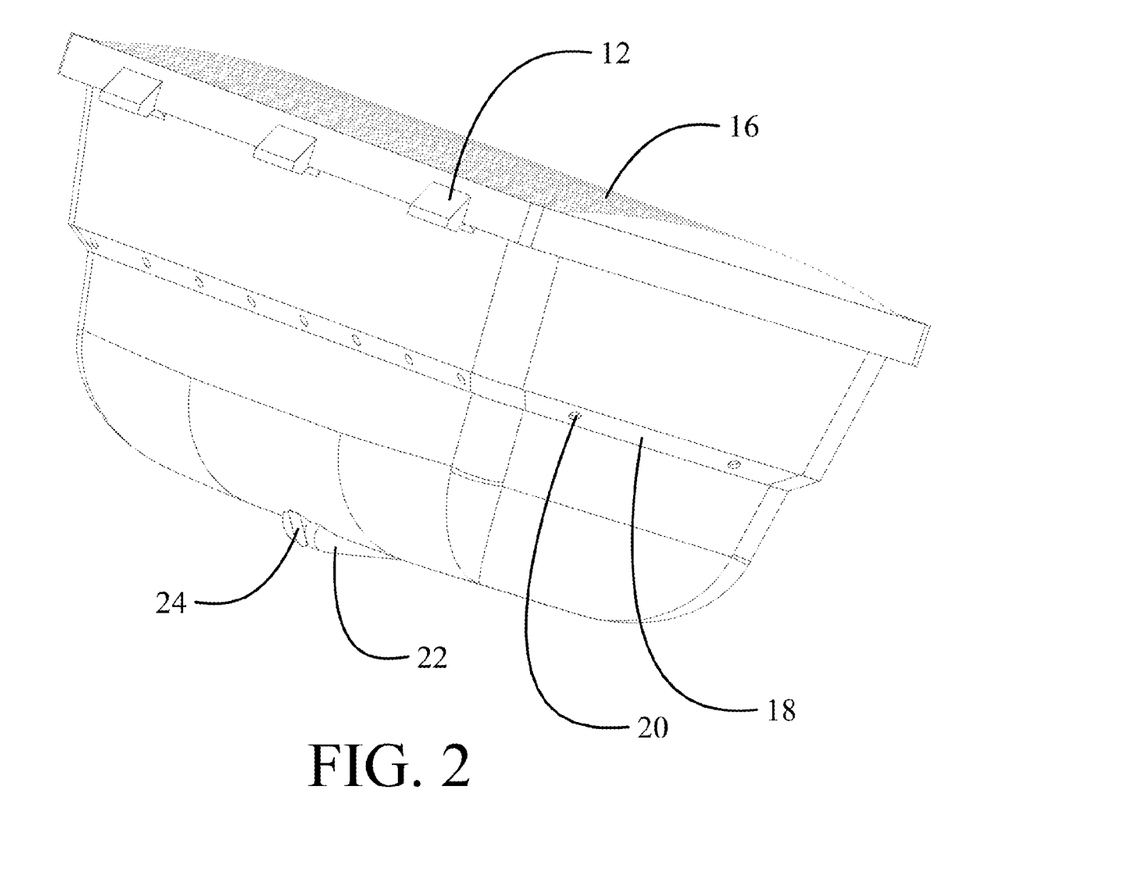
FIG. 2 is a bottom left pictorial view of the aeroponic chamber of FIG. 1.
Figure 3:
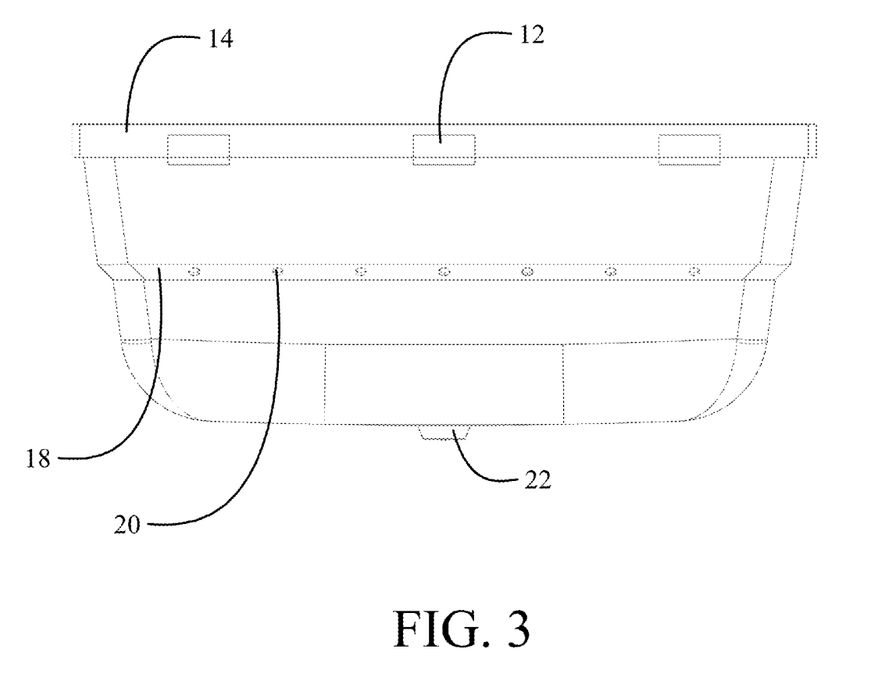
FIG. 3 is a side view of the aeroponic chamber with the support trays removed.
Figure 4:
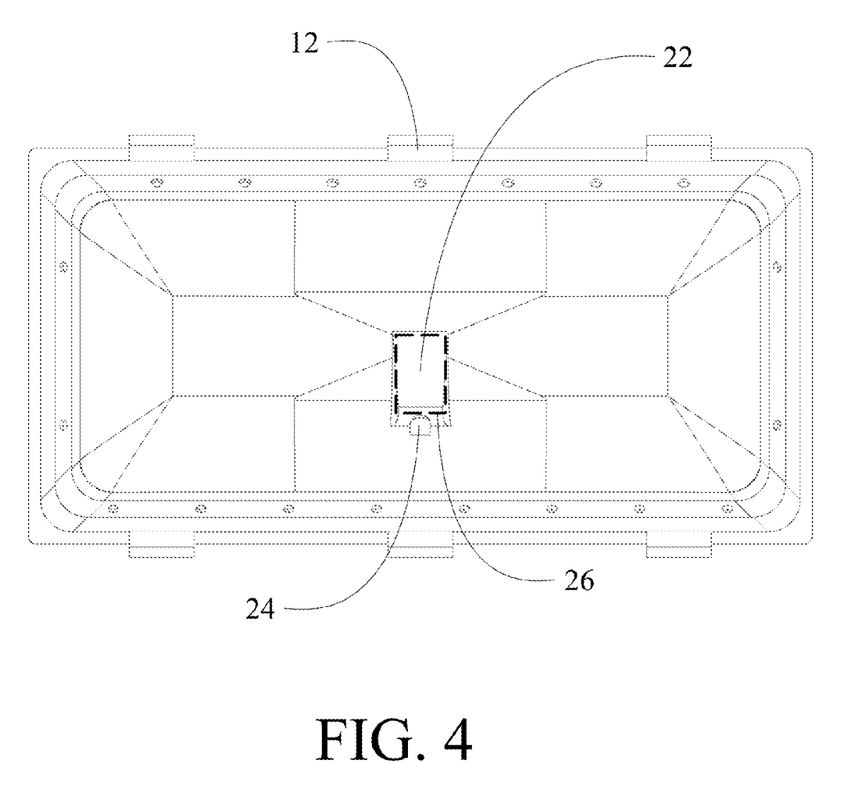
FIG. 4 is a top view of the aeroponic chamber with the support trays removed.

As best seen in FIG. 2, the tub 11 is molded to provide a sloping gradient over the sides and bottom to direct water runoff to a drain sump 22. The drain sump 22 provides an outlet 24 which is connected with drain tubing to a collecting drain line as will be described with respect to FIG. 8. As seen in FIG. 4, the drain sump is sized with a rectangular profile to allow integration of a basket filter 26 (shown in phantom) to catch any plant detritus or other debris which might be entrained in the runoff water. The gradient of the sides of the molded tubs additionally allows the tubs to be nested or stacked compactly for shipment or storage when not in use.

Figure 5:
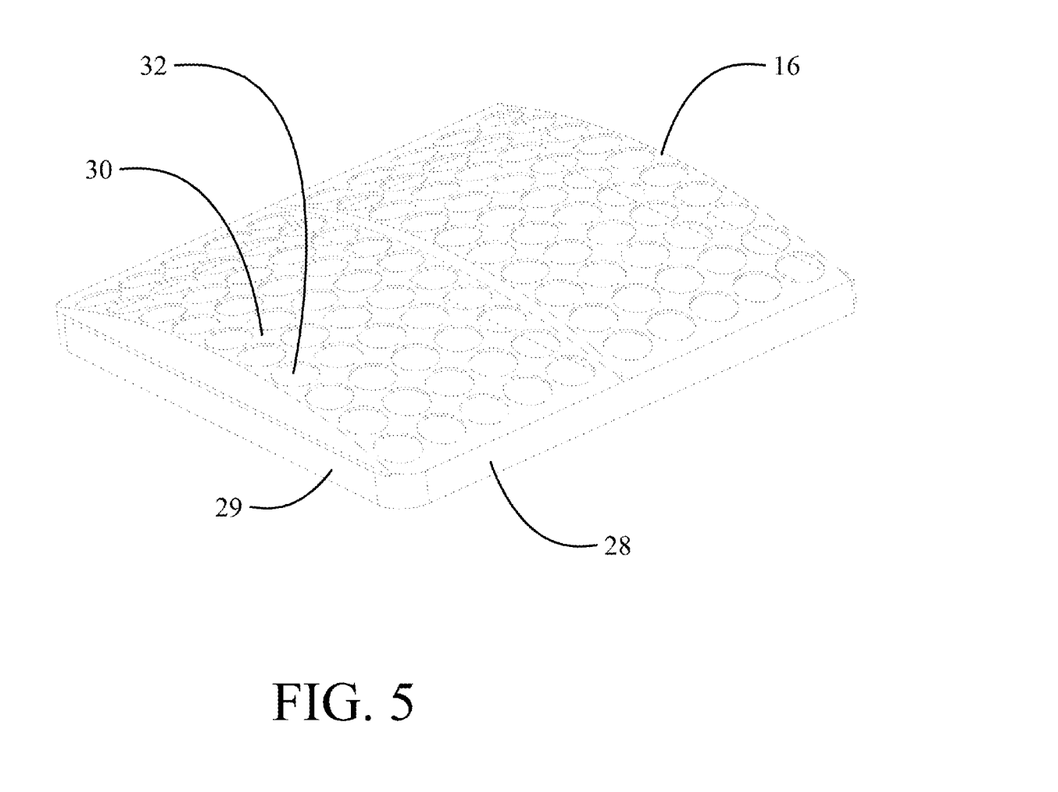
FIG. 5 is a pictorial view of the support trays.

The support trays 16 are substantially rectangular in planform as shown in FIG. 5 with substantially vertical lateral sides 28 and ends 29 to be removably received in a recess in support rim 14. Two symmetrical support trays are shown in the drawings. However in alternative embodiments multiple tray segments may be employed or a single integrated tray. Each tray 16 has a top surface 30 which extends arcuately from the lateral sides 28. While shown in the drawings as arcuate in a single plane, the top surface may be arcuate in multiple planes or emulate a spherical or ellipsoidal section. An array of mounting apertures 32 are spaced on the top surface 30. The arcuate shape of the support trays provides structural integrity allowing heavier plant loads and additionally provides angular positioning of the mesh seed pouches for optimal misting as will be described subsequently. Support trays 16 may be removed with mesh seed pouches and plants in place for ease of initial plant placement and harvesting.

Figure 6:
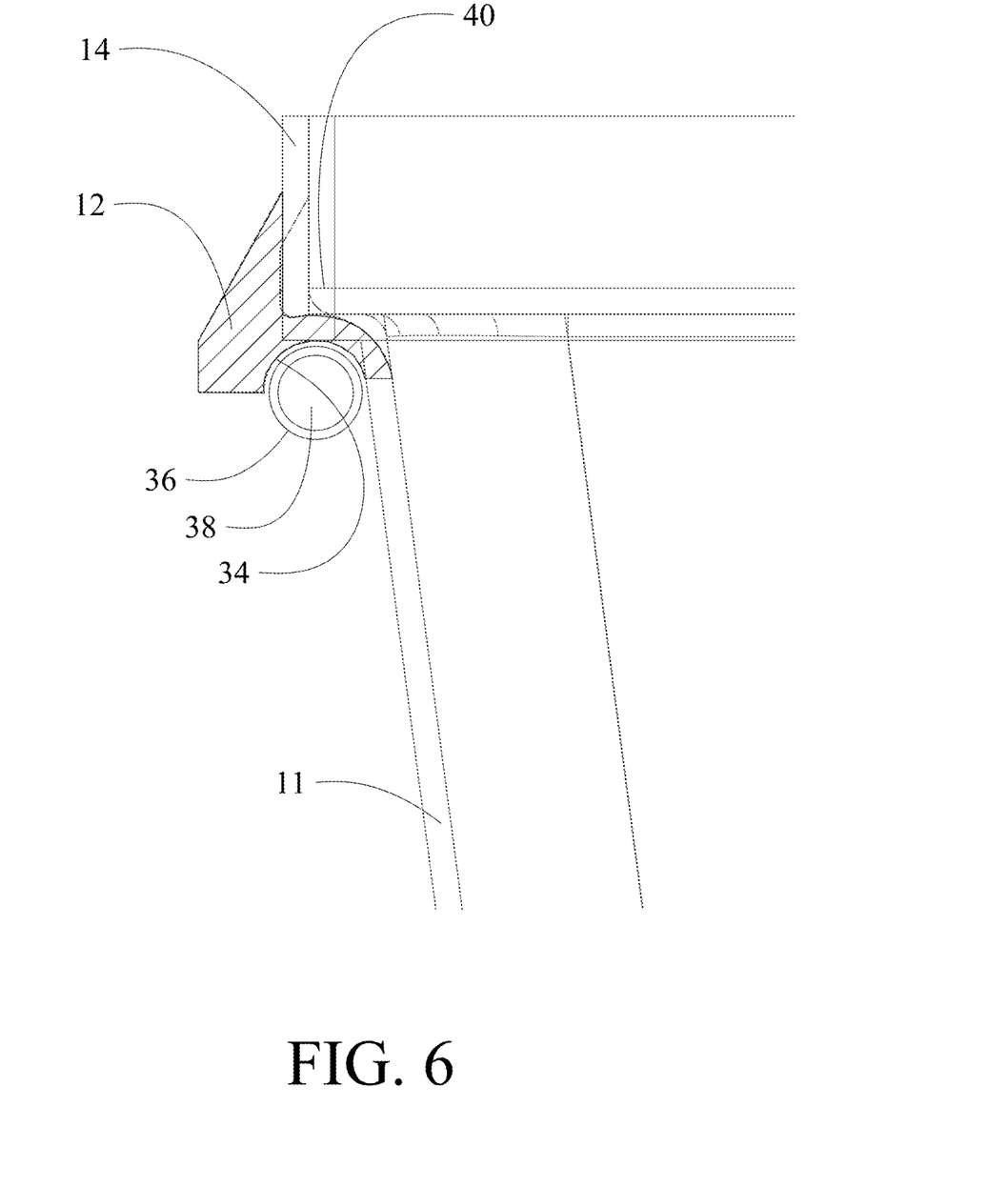
FIG. 6 is an end section view showing the integral mounting brackets.

The molded tub 11 includes support brackets 12 shown in detail in FIG. 6. The support brackets 12 incorporate cylindrical cutouts 34 on a lower surface which are radiused as a saddle to be received over a tubular support rail 36. The molded tub 11 may be lifted off the support rail 36 and the brackets 12 provide integral hand holds for manipulating the aeroponic chambers for assembly onto the support rail matrix or removal for cleaning and maintenance. The support rail 36 additional provides an integrated conduit 38 carrying the water and nutrient mixture for application to the plants. Receiving recess 40 for the support trays is also best seen in FIG. 6.

Figure 7:
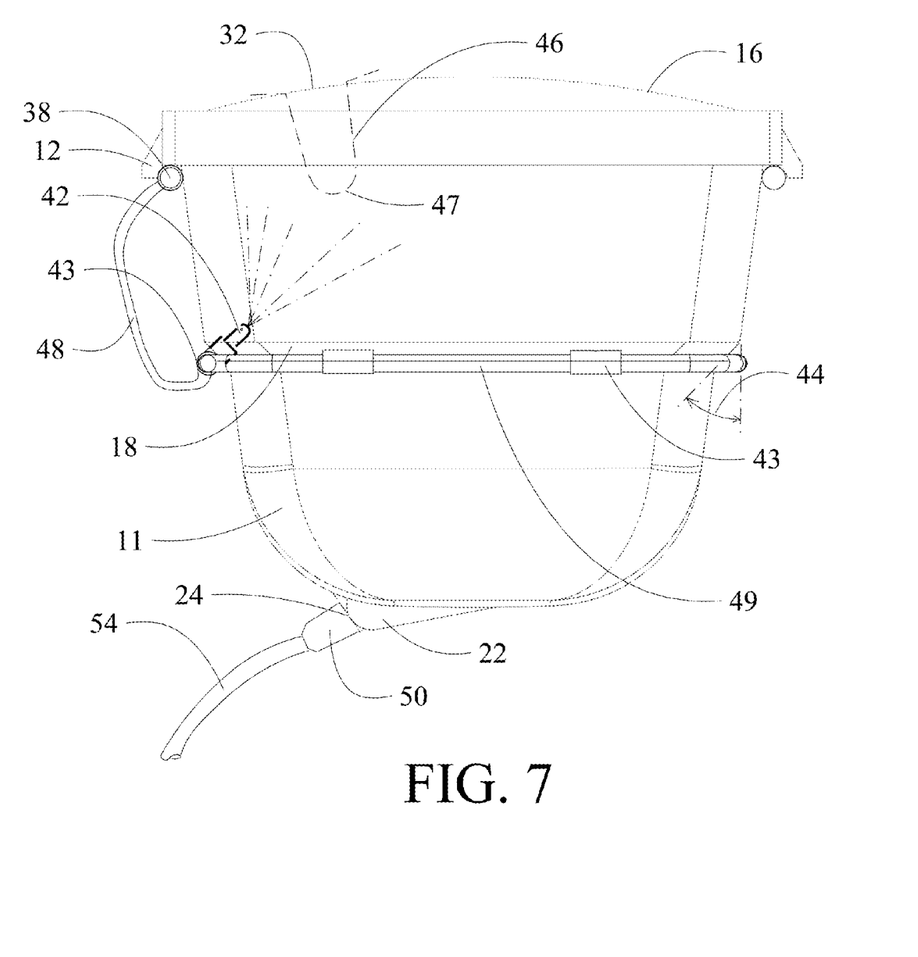
FIG. 7 is a partial end section view showing the misting attachment and support rack with integrated water supply.

As shown in FIG. 7, the molded tub 11 incorporates the integrated angular interface 18 which incorporates ports 20 to receive mister nozzles 42. The angle 44 of the integrated angular interface 18 is determined to provide optimal misting coverage from the installed mister nozzles 42 for mesh seed pouches 46 extending through the apertures 32 in the support trays 16. The nozzles as mounted in the angular interface 18 provide even spray up onto the roots from underneath. In example embodiments, spraying from the sides at root height, directly across the roots did not provide consistent spray coverage. Consequently, roots closer to the center of the chamber had weaker growth. The angular interface mounting of the misters mitigates that problem, and allows use of fewer nozzles at the same pressure because of better coverage. Mesh seed pouches 46 support the upper growth of the plant crop with root holes 47 through which the roots are exposed into the aeroponic chamber for misting. The nonwoven mesh is chosen to specifically allow any seed variety to penetrate the fibers when germinating. The mesh is strong enough to support the young plant until the leafy canopy resting on the trays can do so. Interconnection of the individual mister nozzles to the integrated conduits 38 in the support rails is accomplished with standard fittings and may employ a flexible supply tube 48 to each tub with a mister harness 49 providing a continuous loop of tee fittings 43 connected by high PSI plastic tubing engaging each mister 42. For ease of attachment, the tee fitting doubles as a bulkhead fitting with the mister nozzle threading from the inside of the chamber in the molded tub 11. The integrated angular interface 18 is located at approximately half the depth of the molded tub 11 to allow adequate volume for misting of the plant roots while avoiding fouling of the mister nozzles by accumulated water/nutrient mixture in the bottom of the tub before flowing out of the drain sump.

Figure 8:
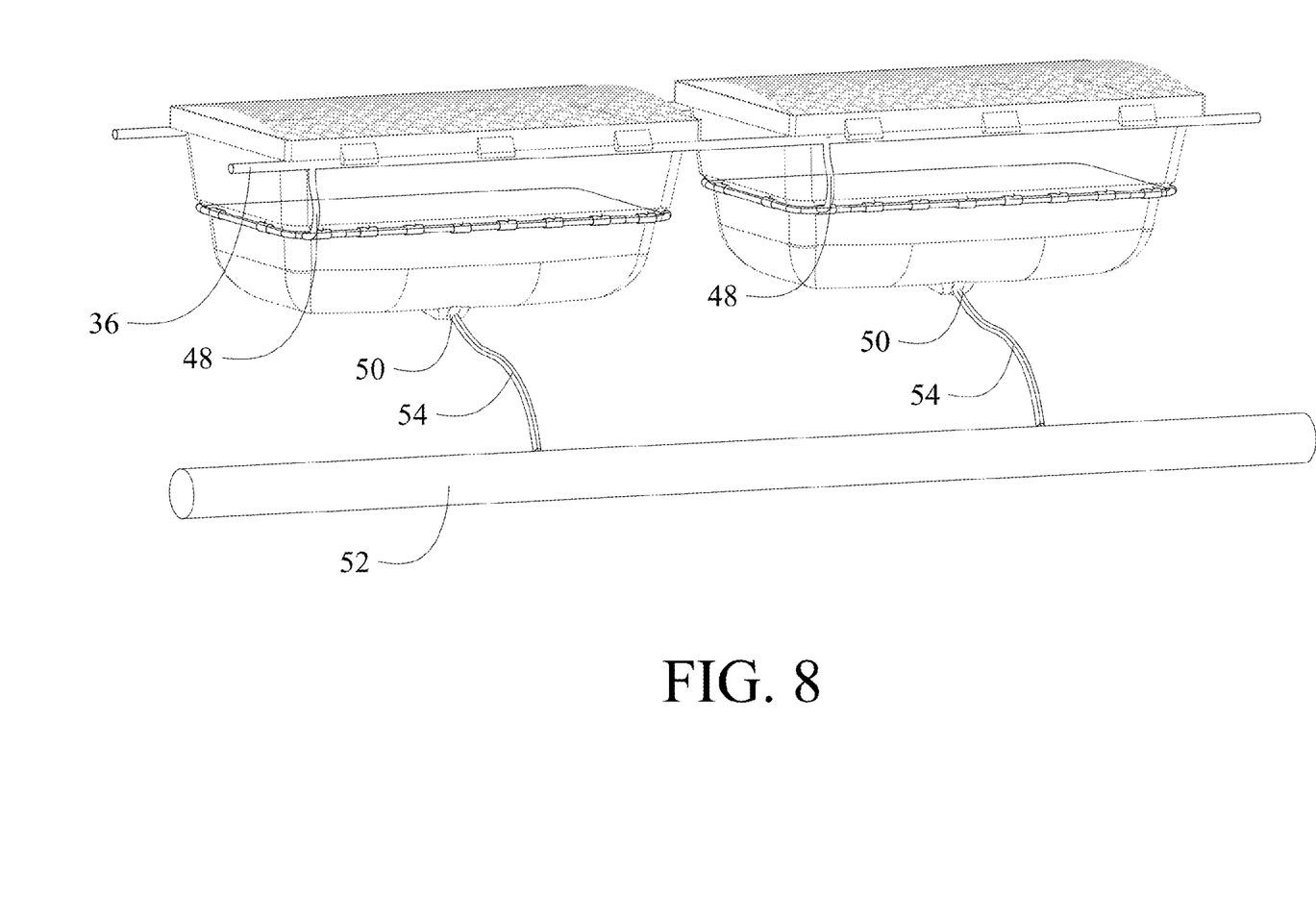
FIG. 8 is side view showing drain attachment to the main drain.
Figure 9:
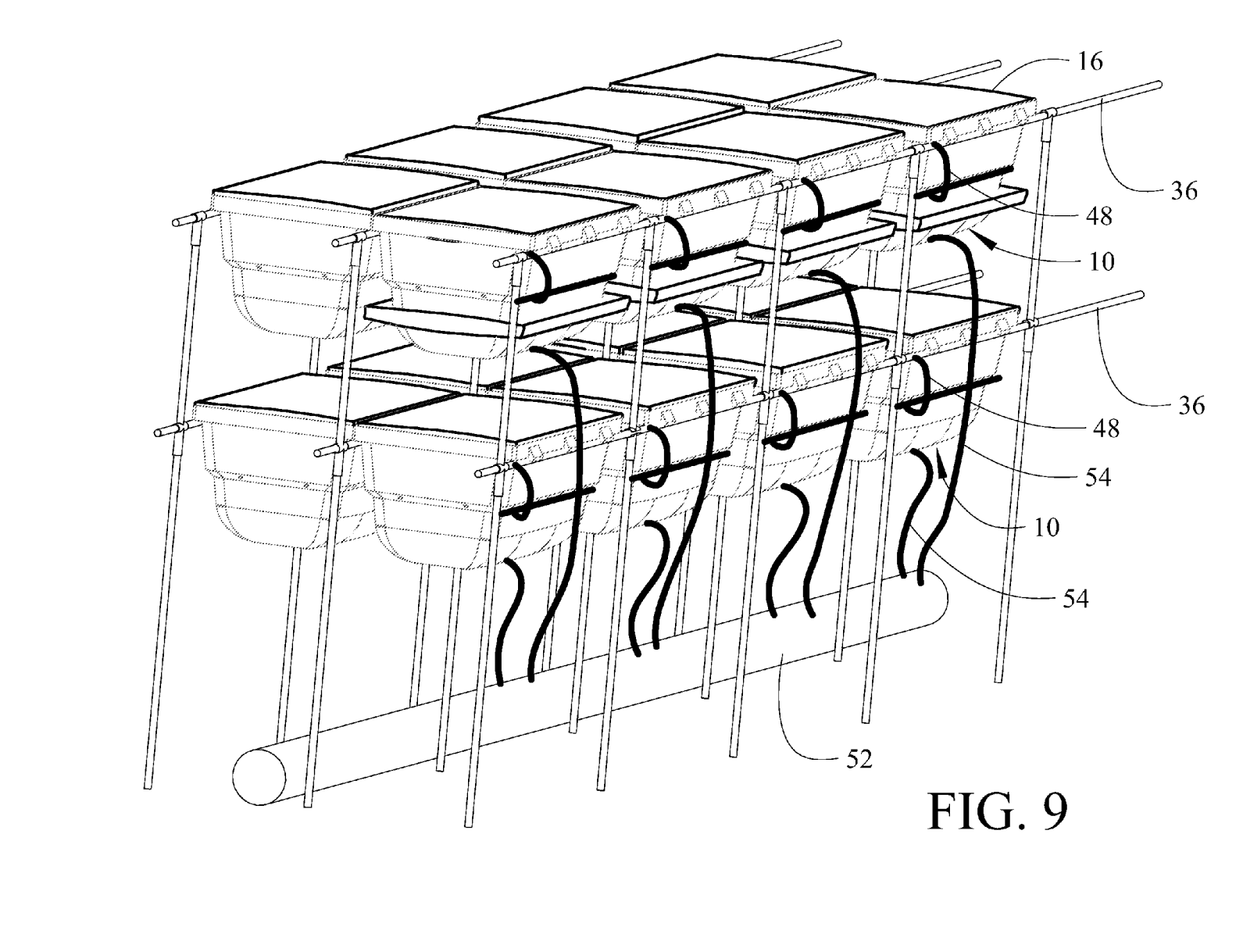
FIG. 9 is an isometric view of an array of aeroponic chambers mounted on support racks with integrated water lines and recovery sump; and, FIG. 10 is a block diagram of a full cycle water handling system for the commercial aeroponic growing system.

Similarly, as shown in FIGS. 7 and 8, the integrated drain fitting 50 inserted in the outlet 24 in drain sump 22 may be connected to a main drain line 52 with flexible drain tubes 54 from each aeroponic chamber 10. A common drain or multiple drain trees may be employed for the array of aeroponic chambers. FIG. 9 shows an example array of aeroponic chambers 10 mounted on a matrix of support rails 36 interconnected with integrated conduits 38 for water and nutrient supply. The main drain line 52 services multiple chambers.

Figure 10:
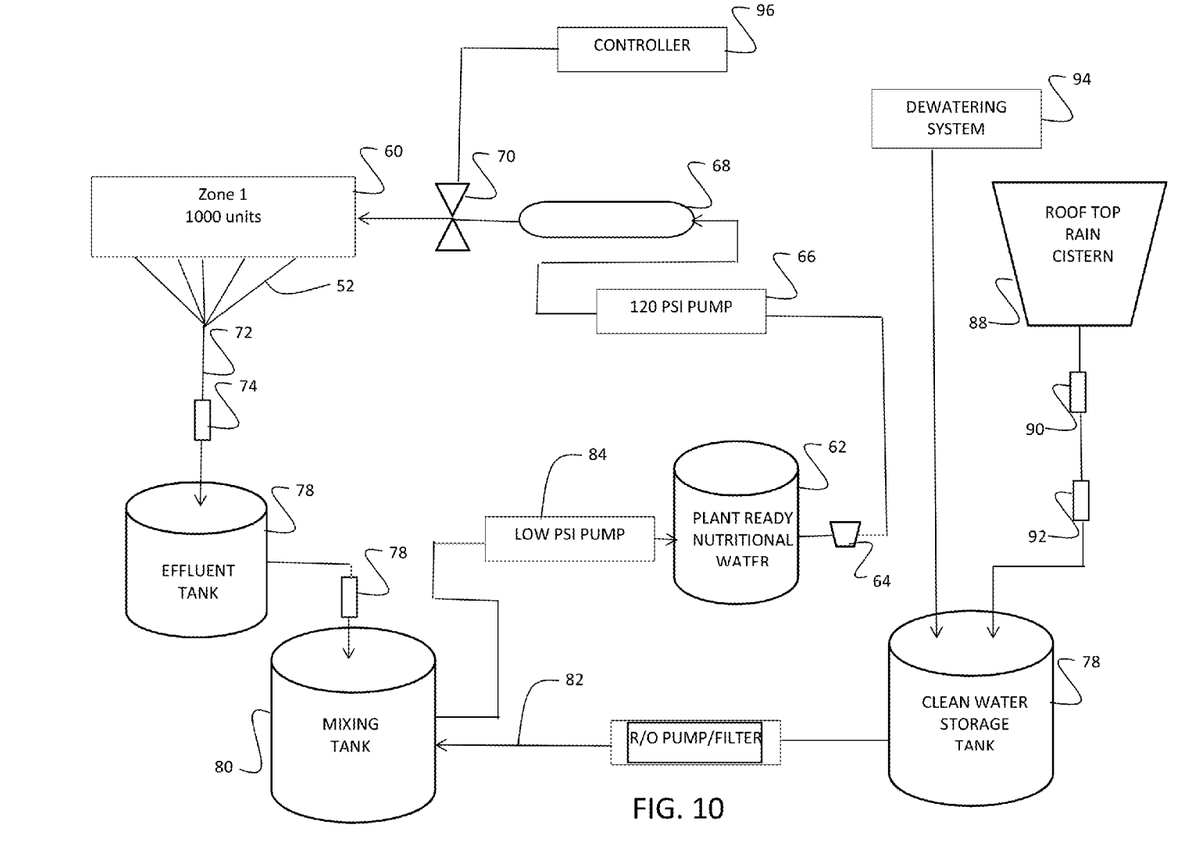

Arrays of aeroponic chambers 10 supported on matrices of support rails 36 may be combined in zones 60 to create a commercial scale aeroponic farm. As shown in FIG. 10, a replenishable closed aeroponic water cycle may then be employed for supplying the farm crop. A plant ready water/nutrient reservoir 62 supplies the water nutrient mix through a strainer or filter 64 using a high pressure pump 66. For an example embodiment one or more 120 psi pumps providing a total flow of approximately 340 gpm will supply a 1000 unit zone. Water/nutrient mix pumped from the reservoir passes through one or more accumulator tanks 68 which hold the water/nutrient mix at the supply pressure. Control solenoid valves 70 are employed to distribute the water/nutrient mix from the accumulator tanks to the integrated supply conduits in the support rail matrix for supply to the aeroponic chambers in the zone 60. Water/nutrient mix draining from the aeroponic chambers is routed by the drain lines 52 to a main drain 72. A particle strainer 74 or similar device removes unwanted materials from the water/nutrient mix to be recycled and drains to an effluent tank 76. Outflow from the effluent tank 76 is routed through a gravity fed ultraviolet (UV) filter 78 or similar device for antimicrobial control and flows into a master control tank 80. The master control tank is operated on with appropriate chemical control systems to pH adjust and balance the water mixture, add nutrients as necessary and adjust total dissolved solids (TDS). The master control tank additionally provides an inlet 82 for supplemental water for the system. A low pressure pump 84 is then employed to provide the adjusted water/nutrient mixture into the reservoir 62.

Replenishment water for the system may be provided to inlet 82 from a clean water storage tank 86 filled from commercial, agricultural well, municipal or other water supply systems. For the exemplary embodiment, the clean water storage tank additionally receives fresh water from a rain cistern 88 from which water flows through a second particulate filter 90 and second UV filter 92 for antimicrobial control. Other water supply sources such as a sewage/digester dewatering system 94 with appropriate particle and antimicrobial filtering may provide inflow for the clean water storage tank. Control of the low pressure and high pressure pumps and solenoid valves is accomplished with a controller 96 programmed to provide water/nutrient misting of the plants aeroponically supported in the zone.

Having now described various embodiments of the invention in detail as required by the patent statutes, those skilled in the art will recognize modifications and substitutions to the specific embodiments disclosed herein. Such modifications are within the scope and intent of the present invention as defined in the following claims.

What is claimed is:

1. An aeroponic farming system comprising:
 a plurality of aeroponic chambers,
 a matrix of support rails having integral water/nutrient conduits, said aeroponic chambers supported on the support rails and interconnected to the water/nutrient conduits;
 at least one drain line connected to the plurality of aeroponic chambers to receive water/nutrient runoff;
 each aeroponic chamber comprising:
 a molded tub having
   an integral angled interface having ports to receive misting nozzles,
   a drain sump including an outlet,
   support brackets incorporating saddles adapted to be received on support rails with integral conduits, said conduits connected to said misting nozzles;
 at least one support tray supported on the molded tub and having a plurality of apertures to receive mesh seed pouches, said support tray having an arcuate top surface.

2. The aeroponic farming system as defined in claim 1 wherein the molded tub further has a recess in a support rim and the at least one support tray is received within the recess.

3. The aeroponic farming system as defined in claim 1 further comprising a filter basket received in the drain sump.

4. The aeroponic farming system as defined in claim 1 wherein the integral angled interface is located about one half the depth of the molded tub.

5. The aeroponic farming system as defined in claim 1 wherein the molded tub has a sloping gradient over sides and bottom of the tub to promote flow into the drain sump.

6. A closed cycle aeroponic farm comprising:
a zone having an array of aeroponic chambers supported on a matrix of support rails with integrated water/nutrient conduits, each aeroponic chamber having
a molded tub having
an integral angled interface located about one half the depth of the molded tub having ports to receive misting nozzles,
at least one support tray supported on the molded tub and having a plurality of apertures to receive mesh seed pouches, said support tray received within the recess and having an arcuate surface;
a plant ready water/nutrient reservoir connected through a high pressure pump to the aeroponic chambers;
a main drain connected to drain lines attached to the aeroponic chambers to receive effluent water/nutrient;
an effluent tank connected to the main drain;
a master control tank connected to receive effluent water/nutrient from the effluent tank;
a low pressure pump connected intermediate the master control tank and the plant ready water reservoir to supply water/nutrient.

7. The closed cycle aeroponic farm as defined in claim 6 further comprising at least one accumulator tank intermediate the high pressure pump and the aeroponic chambers.

8. The closed cycle aeroponic farm as defined in claim 7 further comprising at least one solenoid control valve intermediate the at least one accumulator tank and the aeroponic chambers.

9. The closed cycle aeroponic farm as defined in claim 6 further comprising a clean water storage tank connected to the master control tank for water replenishment.

10. The closed cycle aeroponic farm as defined in claim 9 wherein the clean water storage tank receives water from a rain cistern.

11. The closed cycle aeroponic farm as defined in claim 10 wherein the clean water storage tank receives water from a dewatering system.

* * * * *